(12) United States Patent
Huber

(10) Patent No.: US 10,183,679 B2
(45) Date of Patent: *Jan. 22, 2019

(54) APPARATUS, SYSTEM AND METHOD FOR PERSONALIZED SETTINGS FOR DRIVER ASSISTANCE SYSTEMS

(71) Applicants: VOLKSWAGEN AKTIENGESELLSCHAFT, Wolfsburg (DE); AUDI AG, Ingolstadt (DE)

(72) Inventor: Markus B. Huber, Oakland, CA (US)

(73) Assignees: VOLKSWAGEN AKTIENGESELLSCHAFT, Wolfsburg (DE); AUDI AG, Ingolstadt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/215,546

(22) Filed: Jul. 20, 2016

(65) Prior Publication Data
US 2017/0369073 A1 Dec. 28, 2017

Related U.S. Application Data

(63) Continuation-in-part of application No. 15/195,782, filed on Jun. 28, 2016.

(51) Int. Cl.
*B60W 50/00* (2006.01)
*B60W 40/09* (2012.01)
(Continued)

(52) U.S. Cl.
CPC ........ *B60W 50/0098* (2013.01); *B60W 30/08* (2013.01); *B60W 30/12* (2013.01);
(Continued)

(58) Field of Classification Search
None
See application file for complete search history.

(56) References Cited

U.S. PATENT DOCUMENTS

2014/0371981 A1 12/2014 Nordbruch et al.
2016/0026182 A1* 1/2016 Boroditsky ........... H04L 67/306
701/23

(Continued)

FOREIGN PATENT DOCUMENTS

DE 102011100277 A1 11/2012

OTHER PUBLICATIONS

PCT/EP2017/065962. International Search Report & Written Opinion (dated Oct. 23, 2017).

*Primary Examiner* — Lail A Kleinman
(74) *Attorney, Agent, or Firm* — Loza & Loza, LLP; Peter Zura

(57) ABSTRACT

A system, apparatus and method for controlling operation of a vehicle. Driver assistance system (DAS) data may be used for controlling one or more function of the vehicle via a driver assistance system. Driver profile data (DPD) is generated and/or received that includes training data from sensor monitoring of a driver's usage characteristics for at least one feature of a vehicle type during a driver-controlled mode of vehicle driving. The DPD is processed with the DAS data to determine if the DPD conform to one or more safety metrics. A driver profile data file may be created by weighing the portions of the DAS data with the DPD that do not conform with the safety metrics. One or more functions on the vehicle may be controlled via the driver profile data file using the driver assistance system during one of a semi-autonomous and fully autonomous mode of operation.

20 Claims, 11 Drawing Sheets

(51) Int. Cl.
*B60W 30/12* (2006.01)
*B60W 30/16* (2012.01)
*B60W 30/08* (2012.01)
*B60W 50/14* (2012.01)
*B60W 50/12* (2012.01)

(52) U.S. Cl.
CPC ............ *B60W 30/16* (2013.01); *B60W 40/09* (2013.01); *B60W 50/00* (2013.01); *B60W 50/12* (2013.01); *B60W 50/14* (2013.01); B60W 2050/0077 (2013.01); B60W 2050/0089 (2013.01); B60W 2510/0638 (2013.01); B60W 2510/182 (2013.01); B60W 2520/10 (2013.01); B60W 2520/125 (2013.01); B60W 2520/14 (2013.01); B60W 2540/12 (2013.01); B60W 2540/16 (2013.01); B60W 2540/18 (2013.01); B60W 2540/20 (2013.01); B60W 2540/28 (2013.01); B60W 2540/30 (2013.01); B60W 2550/10 (2013.01); B60W 2550/12 (2013.01); B60W 2550/30 (2013.01); B60W 2550/402 (2013.01); B60W 2550/408 (2013.01); B60W 2750/40 (2013.01)

(56) References Cited

U.S. PATENT DOCUMENTS

| | | | |
|---|---|---|---|
| 2017/0015318 A1* | 1/2017 | Scofield | G08G 1/0112 |
| 2017/0066452 A1* | 3/2017 | Scofield | B60W 50/14 |
| 2017/0088142 A1* | 3/2017 | Hunt | B60W 30/08 |

* cited by examiner

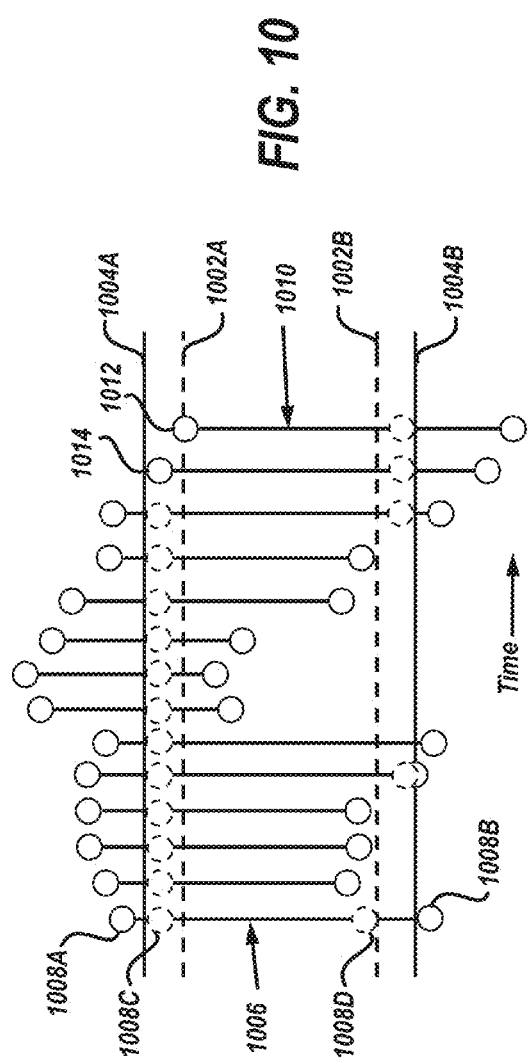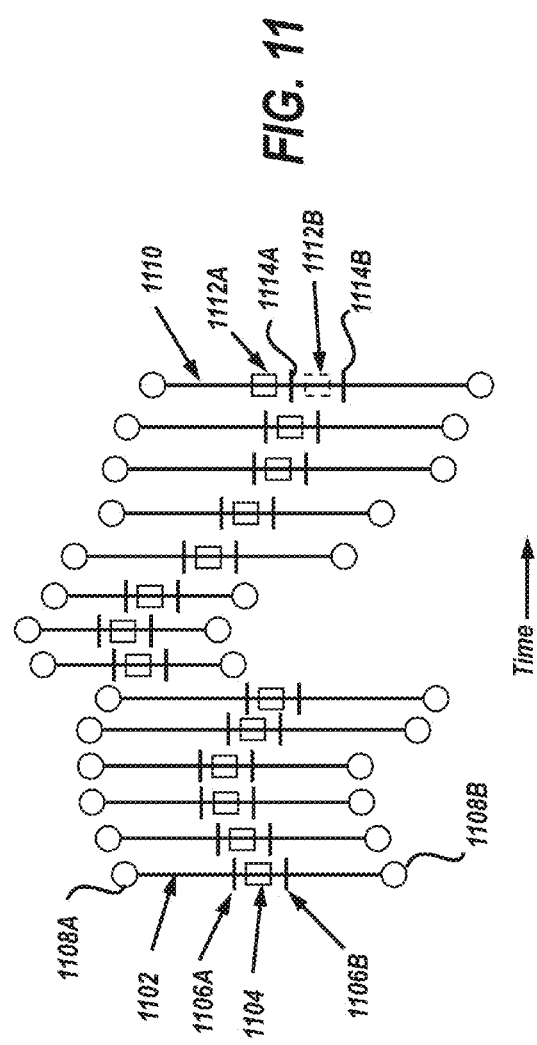

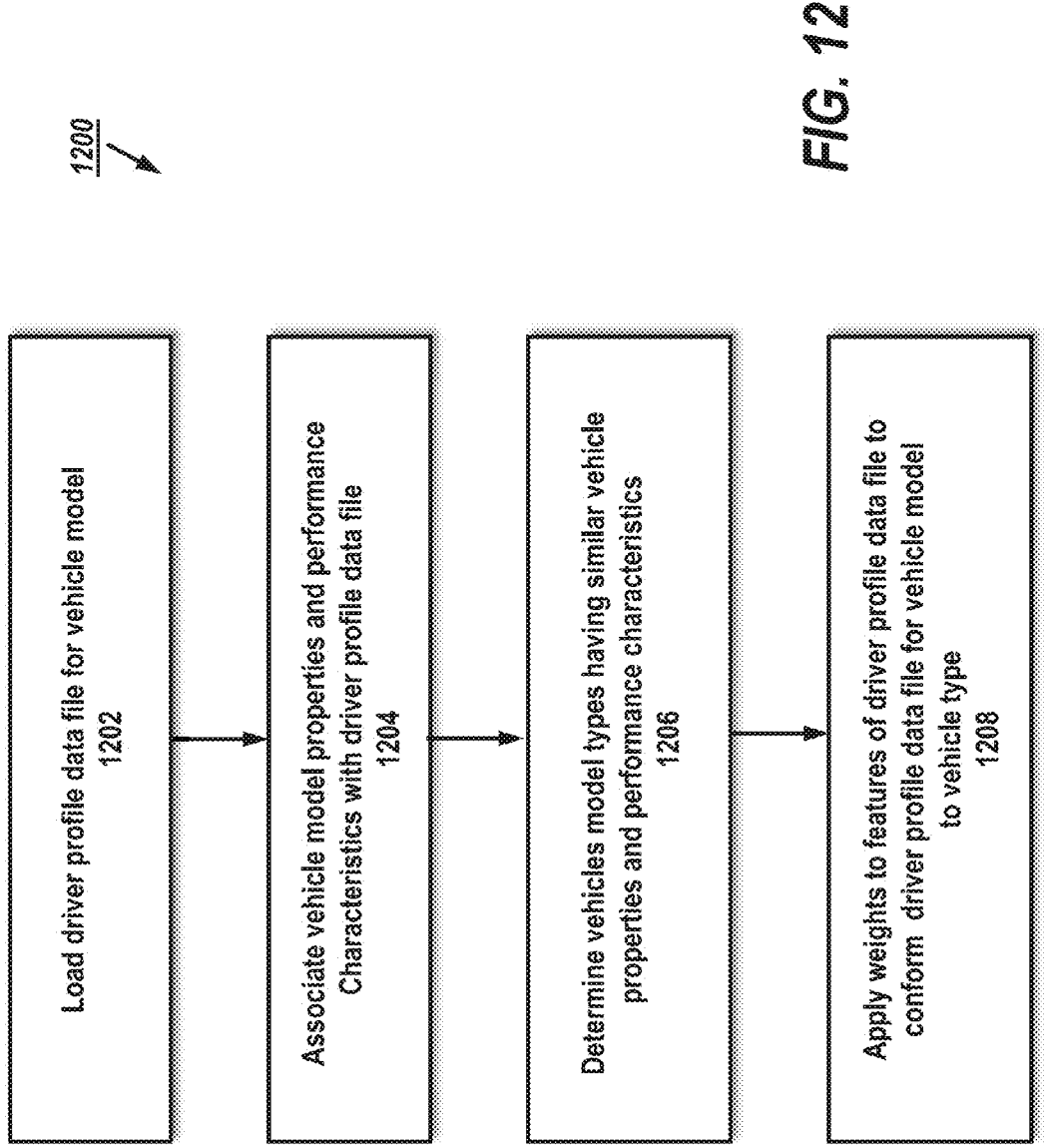

APPARATUS, SYSTEM AND METHOD FOR PERSONALIZED SETTINGS FOR DRIVER ASSISTANCE SYSTEMS

TECHNICAL FIELD

The present disclosure relates to driver assistance systems. More specifically, the present disclosure relates to advanced driver assistance systems where a driver profile may be created from driver performance and behavior data obtained from a vehicle and recalled for a driver or for another, different, driver. Furthermore, the present disclosure relates to processing driver performance and behavior data to conform them to safe levels that may be recalled for different models of a vehicle type.

BACKGROUND

Advanced driver assistance systems (ADAS) are systems developed to automate, adapt, and/or enhance vehicle systems for safety and better driving. Safety features in vehicles are designed to avoid collisions and accidents by offering technologies that alert the driver to potential problems, or to avoid collisions by implementing safeguards and taking over control of the vehicle. Adaptive features may automate lighting, provide adaptive cruise control, automate braking, incorporate GPS/traffic warnings, connect to smartphones, alert driver to other cars or dangers, keep the driver in the correct lane, or show if vehicles and/or objects are present in blind spots.

Despite certain advances in ADAS technology, there are improvements needed, particularly in the area of customizing and/or personalizing ADAS setting for a vehicle. Systems, apparatuses and methods are needed to provide an adaptable system that learns driving performance and/or behavior from the driver to form a driver profile that may be recalled for future use by the driver, another driver, or a driving environment/scenario that is associated with the profile, and be able to normalize and update the driver profile data. In addition, systems and methods are needed to make the driver profile, or portions thereof, transferable or sharable and confirm to certain levels of safety.

SUMMARY

Various apparatus, systems and methods are disclosed herein relating to controlling operation of a vehicle. In some illustrative embodiments, a system is disclosed for controlling operation of a vehicle, the system comprising a processor; a driver assistance system, operatively coupled to the processor, wherein the driver assistance system is configured to control one or more functions on the vehicle using driver assistance system data; and a storage for storing driver profile data, wherein the driver profile data comprises training data relating to a driver's usage characteristics for at least one feature of a vehicle type, wherein the processor is configured to process the driver profile data to determine if at least portions of the driver profile data conform to a safety metric relating to the vehicle, and wherein the processor is configured to weigh a portion of the driver profile data to conform non-conforming portions of the driver profile data to the safety metric, wherein the safety metric comprises at least one maximum and/or minimum threshold for a vehicle performance characteristic of the one or more functions, and wherein the processor is configured to store the conformed driver profile data as a driver profile data file that is configured to control one or more functions on the vehicle using the driver assistance system.

In some illustrative embodiments, a method is disclosed for controlling operation of a vehicle, comprising storing driver assistance system data for controlling one or more function of the vehicle via a driver assistance system; storing driver profile data in a storage, wherein the driver profile data comprises training data relating to a driver's usage characteristics for at least one feature of a vehicle type; processing, via a processor, the driver profile data to determine if at least portions of the driver profile data conform to a safety metric relating to the vehicle; weighing, via the processor, a portion of the driver profile data to conform non-conforming portions of the driver profile data to the safety metric, wherein the safety metric comprises at least one maximum and/or minimum threshold for a vehicle performance characteristic of the one or more functions; and storing the conformed driver profile data as a driver profile data file for controlling one or more functions on the vehicle using the driver assistance system.

In some illustrative embodiments, a method for controlling vehicle operation, the method comprising storing driver assistance system data for controlling one or more vehicle functions via a driver assistance system; storing driver profile data in a storage, wherein the driver profile data comprises training data relating to a driver's usage characteristics for at least one feature of a vehicle model; processing, via a processor, the driver profile data to determine if at least portions of the driver profile data conform to a safety metric relating to a vehicle class; weighing, via the processor, a portion of the driver profile data to conform non-conforming portions of the driver profile data to the safety metric, wherein the safety metric comprises at least one maximum and/or minimum threshold for a vehicle performance characteristic of the one or more functions; and storing the conformed driver profile data as a driver profile data file for controlling one or more functions on a vehicle belonging to the vehicle class using the driver assistance system.

BRIEF DESCRIPTION OF THE FIGURES

The present invention is illustrated by way of example and not limitation in the figures of the accompanying drawings, in which like references indicate similar elements and in which:

FIG. 10 shows a simulated graph of feature clusters for resolving extracted features according to a global safety metric under an illustrative embodiment;

FIG. 11 shows a simulated graph of feature clusters for resolving extracted features according to a local safety metric under an illustrative embodiment; and FIG. 12 shows a process for applying weights to features to conform a driver profile data file for a vehicle to a vehicle type.

DETAILED DESCRIPTION

Figure 1:
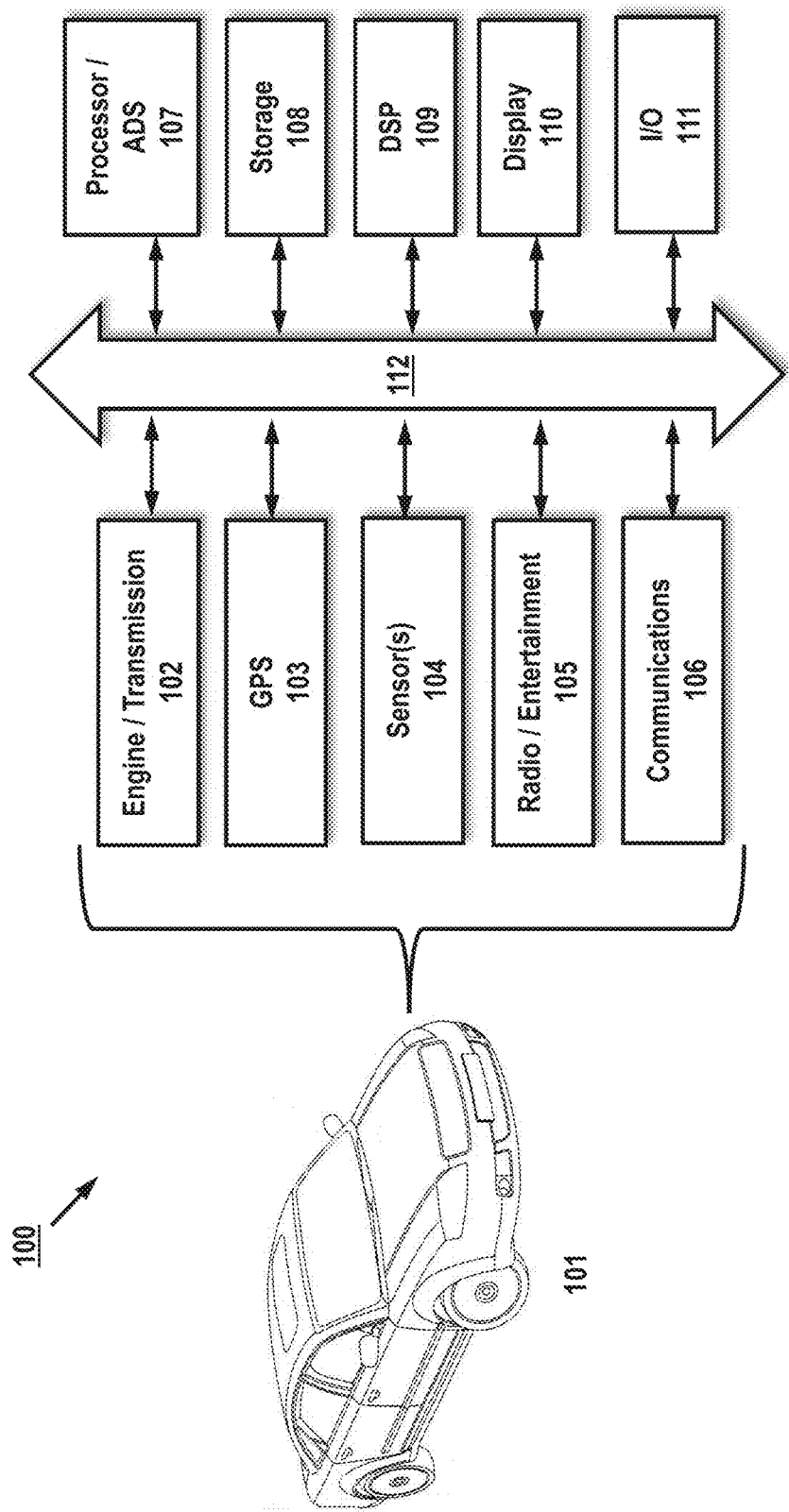
FIG. 1 shows an exemplary vehicle system block diagram showing multiple components and modules, together with a navigation system under an illustrative embodiment.

The figures and descriptions provided herein may have been simplified to illustrate aspects that are relevant for a clear understanding of the herein described devices, structures, systems, and methods, while eliminating, for the purpose of clarity, other aspects that may be found in typical similar devices, systems, and methods. Those of ordinary skill may thus recognize that other elements and/or operations may be desirable and/or necessary to implement the devices, systems, and methods described herein. But because such elements and operations are known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

Exemplary embodiments are provided throughout so that this disclosure is sufficiently thorough and fully conveys the scope of the disclosed embodiments to those who are skilled in the art. Numerous specific details are set forth, such as examples of specific components, devices, and methods, to provide this thorough understanding of embodiments of the present disclosure. Nevertheless, it will be apparent to those skilled in the art that specific disclosed details need not be employed, and that exemplary embodiments may be embodied in different forms. As such, the exemplary embodiments should not be construed to limit the scope of the disclosure. In some exemplary embodiments, well-known processes, well-known device structures, and well-known technologies may not be described in detail.

The terminology used herein is for the purpose of describing particular exemplary embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The steps, processes, and operations described herein are not to be construed as necessarily requiring their respective performance in the particular order discussed or illustrated, unless specifically identified as a preferred order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the exemplary embodiments.

The disclosed embodiments may be implemented, in some cases, in hardware, firmware, software, or any tangibly-embodied combination thereof. The disclosed embodiments may also be implemented as instructions carried by or stored on one or more non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

It will be understood that the term "module" as used herein does not limit the functionality to particular physical modules, but may include any number of software and/or hardware components. In general, a computer program product in accordance with one embodiment comprises a tangible computer usable medium (e.g., standard RAM, an optical disc, a USB drive, or the like) having computer-readable program code embodied therein, wherein the computer-readable program code is adapted to be executed by a processor (working in connection with an operating system)

to implement one or more functions and methods as described below. In this regard, the program code may be implemented in any desired language, and may be implemented as machine code, assembly code, byte code, interpretable source code or the like (e.g., via Scalable Language ("Scala"), C, C++, C#, Java, Actionscript, Objective-C, Javascript, CSS, XML, etc.).

Turning to FIG. 1, the drawing illustrates an exemplary system 100 for a vehicle 101 comprising various vehicle electronics modules, subsystems and/or components. Engine/transmission module 102 is configured to process and provide vehicle engine and transmission characteristic or parameter data, and may comprise an engine control unit (ECU), and a transmission control. For a diesel engine, module 102 may provide data relating to fuel injection rate, emission control, NOx control, regeneration of oxidation catalytic converter, turbocharger control, cooling system control, and throttle control, among others. For a gasoline and/or hybrid engine, module 102 may provide data relating to lambda control, on-board diagnostics, cooling system control, ignition system control, lubrication system control, fuel injection rate control, throttle control, and others. Transmission characteristic data may comprise information relating to the transmission system and the shifting of the gears, torque, and use of the clutch. Under one embodiment, an engine control unit and transmission control may exchange messages, sensor signals and control signals for any of gasoline, hybrid and/or electrical engines.

Global positioning system (GPS) module 103 provides navigation processing and location data for the vehicle 101. The sensors 104 provide sensor data which may comprise data relating to vehicle characteristic and/or parameter data (e.g., from 102), and may also provide environmental data pertaining to the vehicle, its interior and/or surroundings, such as temperature, humidity and the like, and may further include LiDAR, radar, image processing, and computer vision. Radio/entertainment module 105 may provide data relating to audio/video media being played in vehicle 101. The radio/entertainment module 105 may be integrated and/or communicatively coupled to an entertainment unit configured to play AM/FM radio, satellite radio, compact disks, DVDs, digital media, streaming media and the like. Communications module 106 allows any of the modules of system 100 to communicate with each other and/or external devices (e.g., devices 202-203) via a wired connection (e.g., Controller Area Network (CAN bus), local interconnect network, etc.) or wireless protocol, such as Wi-Fi, Bluetooth, NFC, etc. In one embodiment, modules 102-106 may be communicatively coupled to bus 112 for certain communication and data exchange purposes.

Vehicle 101 may further comprise a main processor 107 that centrally processes and controls data communication throughout the system 100. In some illustrative embodiments, the processor 107 is equipped with advanced driver assistance modules that allow for communication with and control of any of the modules in vehicle 100. Storage 108 may be configured to store data, software, media, files and the like, and may include vehicle data, sensor data and driver profile data, discussed in greater detail below. Digital signal processor (DSP) 109 may comprise a processor separate from main processor 107, or may be integrated within processor 107. Generally speaking, DSP 109 may be configured to take signals, such as voice, audio, video, temperature, pressure, position, etc. that have been digitized and then process them as needed. Display 110 may be configured to provide visual (as well as audio) indicial from any module in FIG. 1, and may be a configured as a LCD, LED, OLED, or any other suitable display. The display 110 may also be configured with audio speakers for providing audio output. Input/output module 111 is configured to provide data input and outputs to/from other peripheral devices, such as key fobs, device controllers and the like. As discussed above, modules 107-111 may be communicatively coupled to data bus 112 for transmitting/receiving data and information from other modules.

Figure 2:
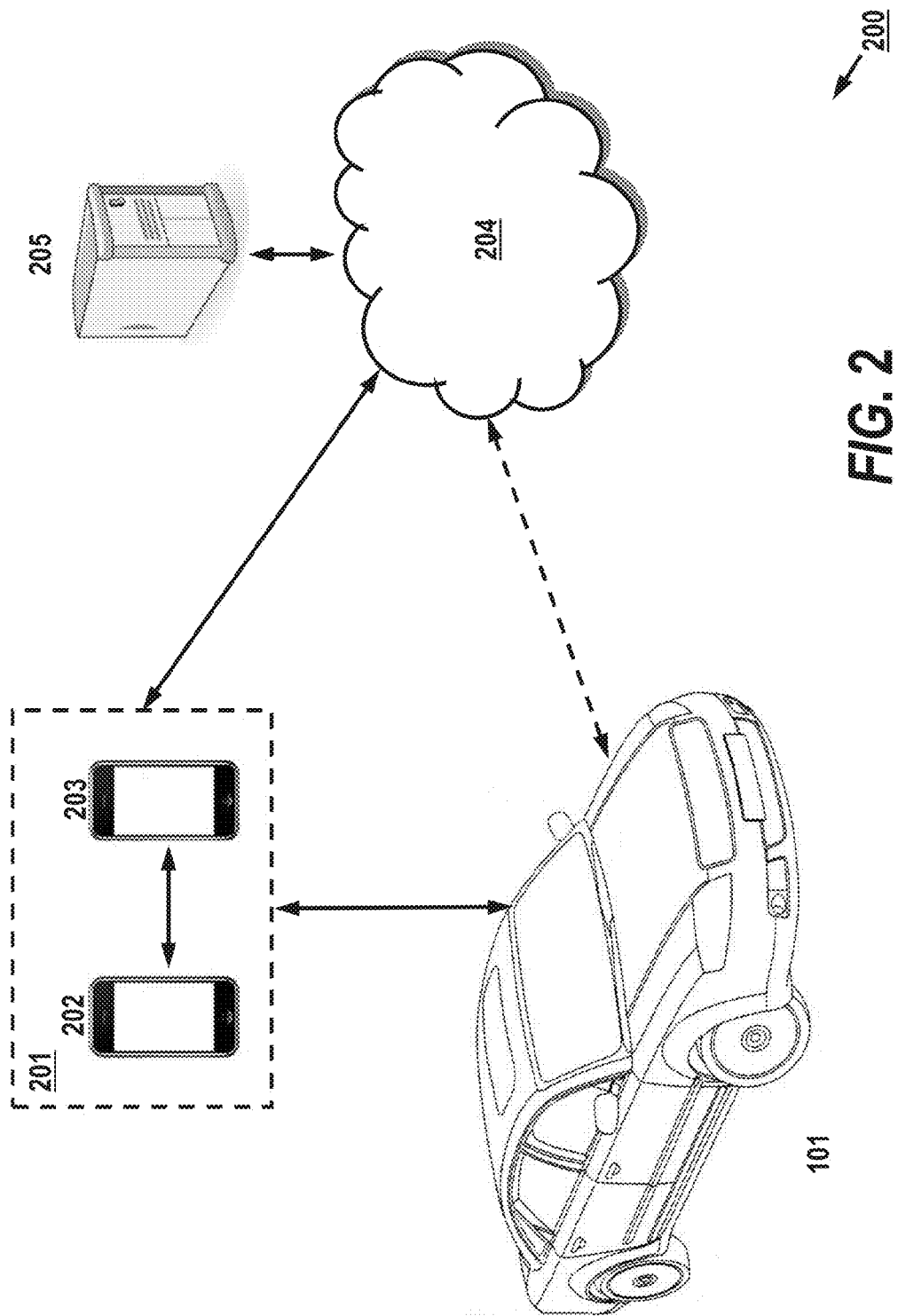
FIG. 2 is an exemplary block diagram illustrating the vehicle of FIG. 1 communicatively coupled to one or more portable devices and a computer network under an illustrative embodiment.

Turning to FIG. 2, an exemplary embodiment is illustrated, where a vehicle (e.g., 101), is paired with one or more devices 201 (202, 203) which may be registered to one or more users. Devices 201 may be registered with vehicle 101 using Bluetooth pairing or using Wi-Fi or NFC registration, as is known in the art. Preferably, device 201 registrations are stored (e.g., 108) at the vehicle according to a device ID or SIM ID, and may further include a device user profile associated with each ID that may include demographic data, user interests, and/or user device/vehicle history. In the embodiment of FIG. 2, devices 202, 203 may configured to communicate data with vehicle 101, and may be further configured to communicate with each other. Portable devices 201 are also configured to communicate with wireless network 204 in order to send/receive data from a central server 205 that may include one or more server. Similarly, in one embodiment, vehicle 101 may also be configured to communicate with network 204. Server 205 may be also configured to perform back-end processing for devices 201 and vehicle 101 as needed, and further communicate with other remote servers for additional functionalities. In some illustrative embodiments, vehicles (e.g., 101) may be equipped with their own SIM card for communication.

Figure 3:
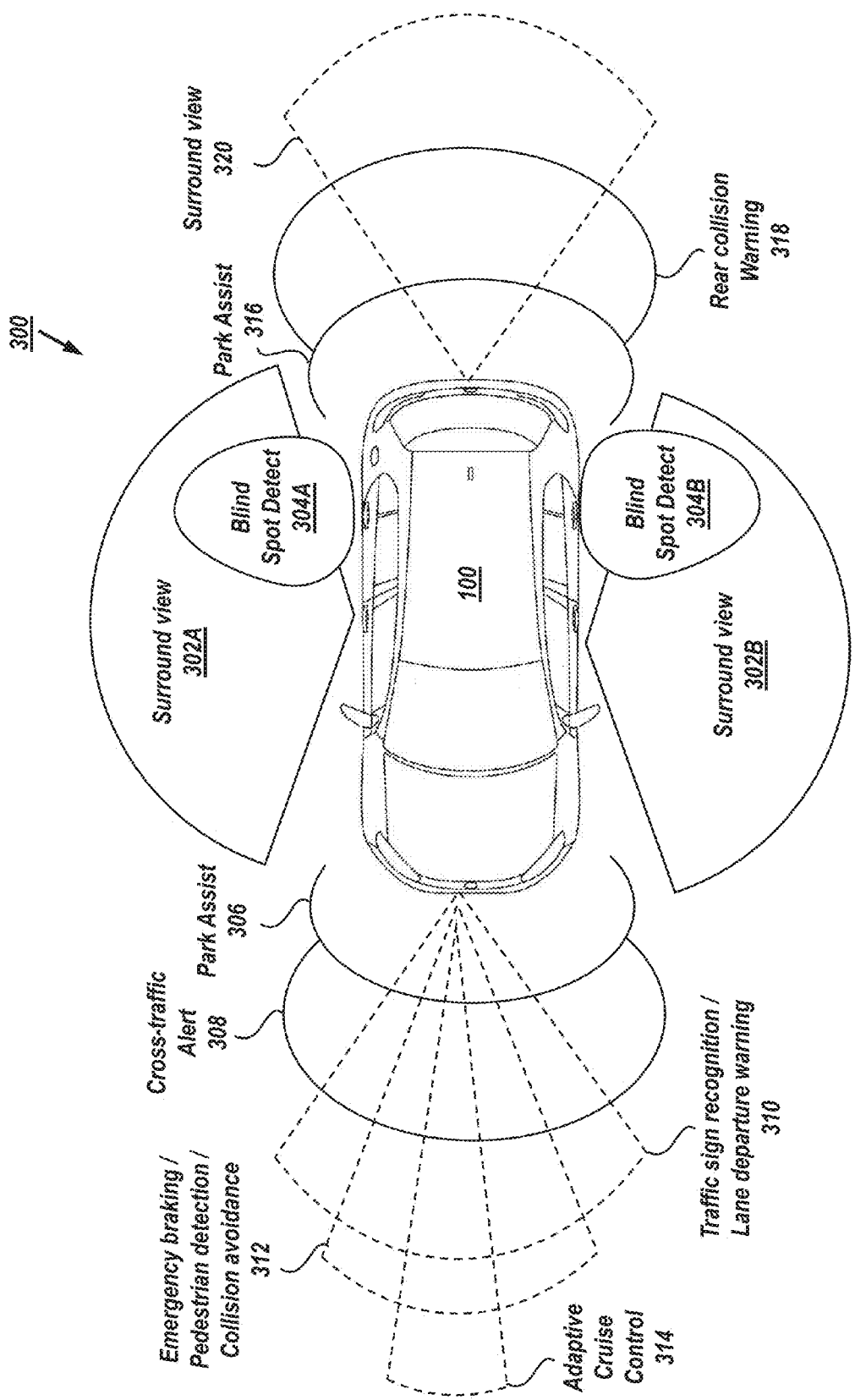
FIG. 3 shows a driver assistance system and configuration for sensing and providing data for external vehicle environment and characteristics under an illustrative embodiment.

FIG. 3 is an exemplary embodiment of an advanced driver system 300 that includes components of FIG. 1, where the sensors 104 may include LiDAR, radar, image processing, computer vision, and may also include in-car networking, as well as additional inputs from other sources separate from the primary vehicle platform via communications 106, such as Vehicle-to-vehicle (V2V), or Vehicle-to-Infrastructure (such as mobile telephony or Wi-Fi data network) communication and systems. Using various individual and/or combinations of sensors (e.g., 104), vehicle 100 may be equipped with surround view (302A, 302B), that may be configured, under one embodiment, using a camera in the middle of a front grille of the vehicle, dual ultra-wide-angle cameras from the side view mirrors along the flanks on the car, and another positioned above the license plate. During operation, software may stitch the images together and insert an image of the vehicle in the middle. Of course, those skilled in the art will recognize that other configurations are possible and contemplated in the present disclosure. Blind spot detectors 304A, 304B may be configured using sensors, such as surround view sensors (302A, 320B), and/or be equipped with independent sensors that use imaging and/or electromagnetic waves to detect other vehicles and/or objects present in the vehicle's blind spot.

A front portion of the vehicle 100 may be equipped with park assist 306, cross-traffic alert 308, traffic sign recognition and lane departure warning 310, emergency braking/pedestrian detection/collision avoidance 312 (collectively "collision avoidance") and adaptive cruise control 314. A rear portion of the vehicle 100 may be equipped with park assist 316, rear collision warning 318 and surround view 320. In some illustrative embodiments, park assist 306, as well as rear park assist 316 may utilize the processor 107 which may be operatively coupled to the vehicle's sensors 104, that may include sonar, one or more backup cameras and additional forward sensors on the front side fenders. The sonar and sensors may be configured on the forward and rear bumpers to detect obstacles, allowing the vehicle to sound warnings and calculate optimum steering angles during regular parking. During operation, the processor(s) (e.g., 107) may calculate steering angle data which are displayed on a navigation/camera touchscreen (e.g., 103) along with obstacle information. When the vehicle is shifted to reverse, the backup camera screen features parking buttons which can be used to activate automated parking procedures. When activated, the processor (e.g., 107) may calculate an optimum parallel or reverse park steering angles and then interfaces with the electric power steering systems (e.g., 102) of the vehicle 100 to guide the car into a parking spot. The cross traffic alert 308 and rear-collision warning 318 may be incorporated as independent modules or configured as part of the blind-spot detection (304A, 304B). Cross traffic alert 308 and rear-collision warning 318 utilize sensors for vehicle detection while in drive (308) or may activate when the vehicle is in reverse (318). During operation, they detect vehicles that might be crossing into a forward or rearward path, and, when an oncoming vehicle is detected, the system generates an alert.

Traffic recognition/lane departure warning module 310 may include a forward-facing camera that may be incorporated with other modules of FIG. 3, and is configured to scan a road ahead for traffic signs. This camera is connected to character recognition software, which may monitor and process any changes described by the signs, and relaying it onto the car's instrument panel. A lane departure module of 310 captures a moving view of the road ahead. The digitized image is parsed for straight or dashed lines (i.e., the lane markings). As the car deviates and approaches or reaches a lane marking, the vehicle issues a warning. The lane departure module 310 may incorporate a lane assist feature, where, if a vehicle reaches a lane marking, the vehicle, via assisted steering, may move itself away from the marker. Sometimes the steering change may be effected by braking the opposite front wheel, pivoting the vehicle.

Collision avoidance module 312 may be configured as a radar (all-weather) and may incorporate laser and camera to detect an imminent collision. Once the detection is processed, the module 312 may provide a warning to the driver when there is an imminent collision, and/or control the vehicle autonomously without any driver input (by braking or steering or both). Adaptive cruise control module 314 (or "autonomous cruise control") may be a laser-based system and/or radar-based system, where the sensors automatically adjust the vehicle speed to maintain a safe distance from vehicles ahead. If configured as a cooperative adaptive cruise control system. the module 314 further extends the automation of navigation by using information gathered from fixed infrastructure such as satellites and roadside beacons, or mobile infrastructure such as reflectors or transmitters on the back of other vehicles.

Figure 4:
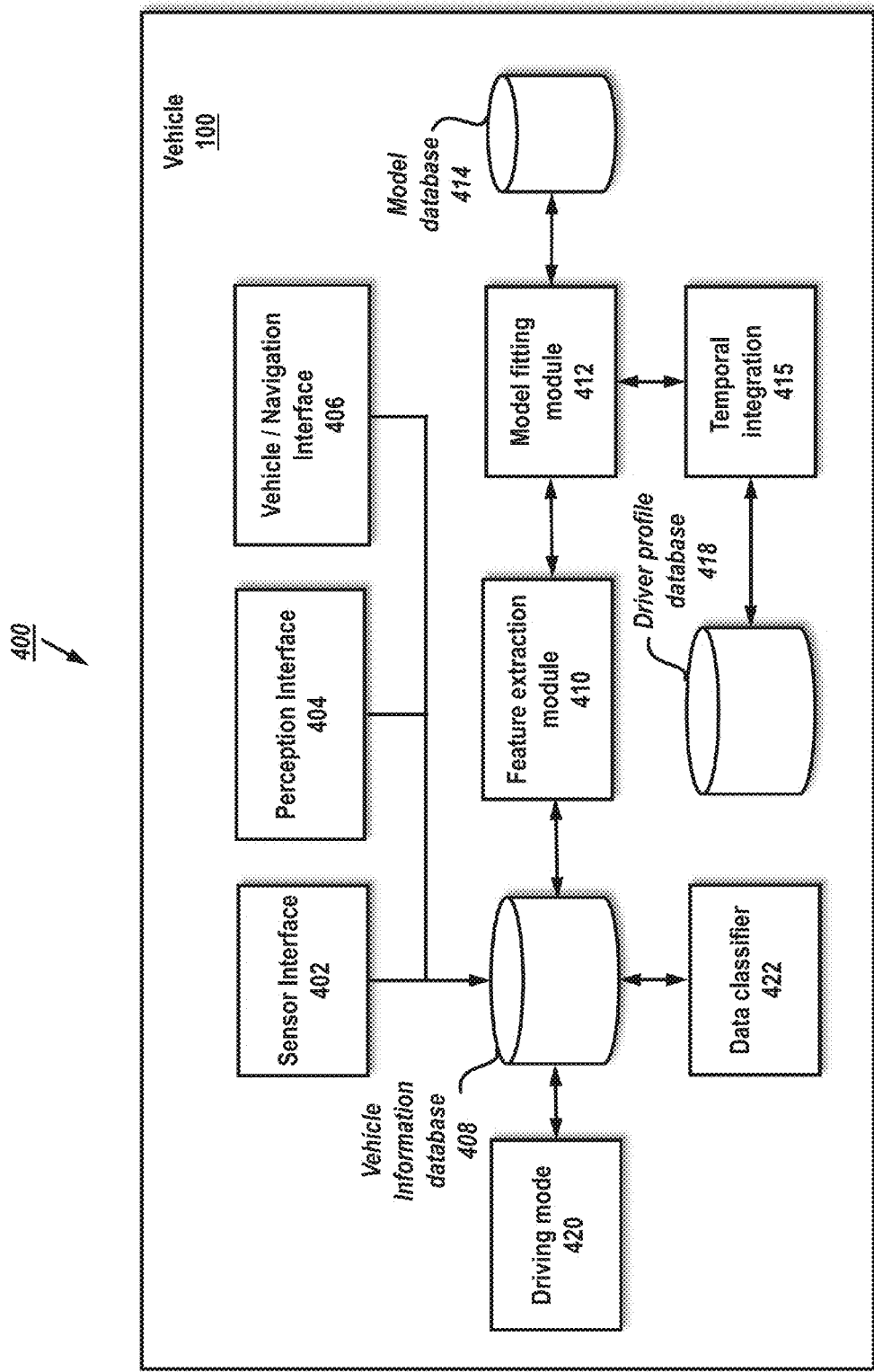
FIG. 4 shows an operating environment for vehicle modules configured to generate driver profiles based on data received from a sensor interface module, perception interface module, and a vehicle/navigation interface module.

Turning to FIG. 4, the drawing shows an operating environment 400 for vehicle modules (102-111, 302A-320) configured to generate driver profiles based on data sampled/received from a sensor interface module 402, perception interface module 404, and a vehicle/navigation interface module 406. Driver characteristic data (i.e., data describing one or more manners in which a driver is driving a vehicle) may be obtained from a plurality of sources and, under an illustrative embodiment, the sources and the data types may be classified for driver profile training purposes. In the example of FIG. 4, sensor interface module 402 receives signals from electromagnetic sources (e.g., radar), electro-optical sources (e.g., laser) or a combination of both (e.g. LiDAR) from the vehicle 100. Perception interface module 404 receives signals converted and processed from perceptual mediums, such as cameras, microphones, etc. Vehicle/navigation interface module 406 receives data from vehicle sensor components (e.g., speedometer, brake, etc.) as well as GPS and related navigational data. Data received from the sensor interface module 402, perception interface module 404 and vehicle/navigation interface module 406 may be stored in vehicle information database 408. Additional external data, such as weather and/or traffic event data, which may be received from $3^{rd}$ party sources, may also be received and merged with the sensor interface module 402, perception interface module 404 and/or vehicle/navigation interface module 406.

In an illustrative embodiment, the collection of data from modules 402-406 may also include a driving mode module 420 that monitors and provides data for the driving mode in which the vehicle is in. The driving modes may include, but are not limited to, a driver-controlled mode, where vehicle operation is predominantly control by the driver alone, a semi-autonomous mode, where some, but not all, vehicle operations are controlled by the vehicle or shared between the vehicle and the driver, and fully-autonomous mode, where the vehicle has control of the vehicle and does not require driver input. The data classifier module 422 processes and classifies the data from 402-406 in order to classify and organize the data in accordance with data origin (e.g., sensor, camera, etc.) and data type, among others. At least some of the data stored in the vehicle information database 408 may be processed by the feature extraction module 410 that is configured to extract features of interest from the vehicle data. In some illustrative embodiments, multiple feature extractors are configured within the feature extraction module 410 in order to extract different features from different types of data. For example, simplified extracted features may include, but are not limited to, maximum, minimum, mean and/or average speed or standard deviation thereof, acceleration vectors, headings, etc. More complex extracted features may include, but are not limited to, scaling, principle component analysis and/or feature space reduction of simplified features, and may also include feature design, such as those associated with neural networks.

Model fitting module 412 may comprise one or more models for processing the data and/or extracted features using models called from model database 414. The models may include, but are not limited to, Gaussian mixture models (GMM), support vector machines, neural networks, Random Forest, Naïve Bayes, and/or k-NN (k-nearest neighbors). In one illustrative embodiment, the data classifier may be configured to provide identification bits and/or identification headers to data according to each data type/classification. After undergoing any necessary feature extraction from feature extraction module 410, the model fitting module 412, using one or more lookup tables or any other suitable technique, may select one or more corresponding models to apply to the data from model database 414. Once the model is applied in module 414, data may be temporally integrated via temporal integration module 416. The temporal integration may be based on, for example, fixed periods of time (e.g., hour(s), day(s), week(s), etc.), travel time from one destination to another, time segments between different vehicle operations (e.g., after brake is released, and accelerator is activated, and vehicle is maintained at a constant speed, or, steering wheel angle and lateral acceleration during frequent changes in gear shift level, etc.).

After temporal integration, the individual and/or combined data from 410, 412 and 416 is stored in driver profile database. Once the data is stored, it may be periodically or continuously updated as the vehicle is being driven. In an illustrative embodiment, during updating, once the data from the model fitting module 412 maintains values within pre-determine thresholds (e.g., provides sufficiently similar results for a driving characteristic or event), the driver profile may be stored as a completed profile that is not updated unless manually instructed otherwise. The operating environment 400 of vehicle 100 may be utilized to train data during the creation of a driver profile, where a plurality of iterations of data collection and processing is performed before a completed driver profile is formed and stored.

Figure 5:
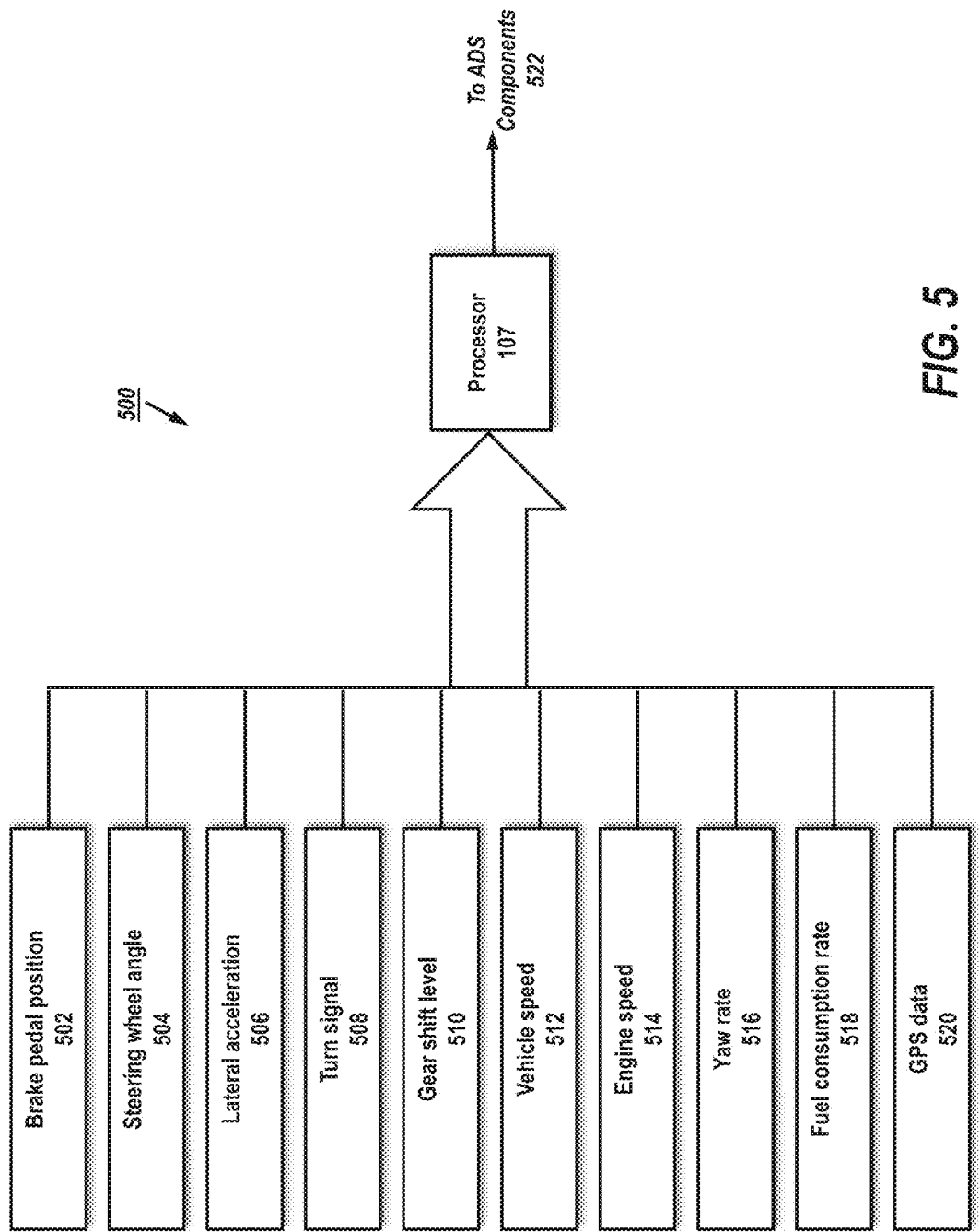
FIG. 5 shows an operating environment for the vehicle for obtaining and processing multiple different vehicle data sources for generating a driver profile for use in advanced driver assistance setting and/or control.

Turning now to FIG. 5, an exemplary signal flow of an operating environment for the vehicle 100 for obtaining and processing multiple different vehicle data sources via processor 107 for generating a driver profile for use in advanced driver assistance setting and/or control under an illustrative embodiment. Each of the signals in FIG. 5 may originate from sensors (e.g., 104) in the vehicle 100 that respectively monitor vehicle performance at each vehicle component (e.g., brakes, engine. steering wheel, etc.). It should be appreciated by those skilled in the art that the sensor signals may be subjected to processing, such as signal conditioning, analog-to-digital conversion, and the like, before reaching a respective interface (e.g., 402-406) and processor 107. In the simplified example of FIG. 5, sensor signals may monitor driver characteristics including brake pedal position 502, steering wheel angle 504, lateral acceleration 506, turn signal 508, gear shift level 510, vehicle speed 512, engine speed 514, yaw rate 516, fuel consumption rate 518 and GPS data 520. Of course other suitable signals (e.g., accelerometer signals, image-recognition signals, distances to objects, etc.) are contemplated in the present disclosure and are not limited by the examples shown. As the signals 502-520 are transmitted to processor 107, where they may undergo processing as described above in the example of FIG. 4 and produce a driver profile and output 522 which, in illustrative embodiments may be driver assistance system control signals using parameters derived from the profile data. In other illustrative embodiments, the output 522 may be a completed driver profile file that is transmitted to another vehicle or computing device for reuse (i.e., using the same driver profile for a different vehicle)

Figure 6:
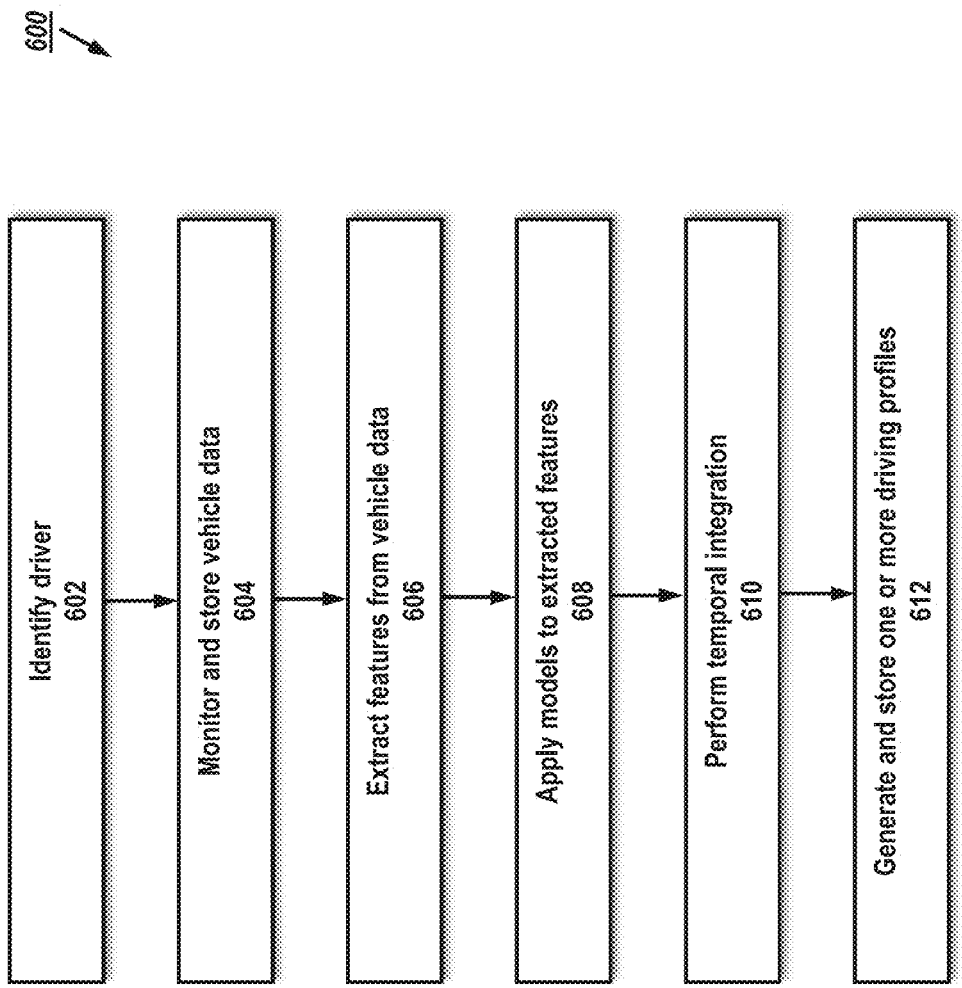
FIG. 6 shows a process for monitoring vehicle data for feature extraction and modeling for generating and storing one or more driving profiles.

FIG. 6 shows a process 600 for monitoring vehicle data for feature extraction and modeling for generating and storing one or more driving profiles. In block 602, the vehicle (e.g., 101) may identify a driver before the vehicle is driven. The identification may occur via a user device (e.g., 201) that is registered with the vehicle, a key fob, password entry, facial recognition, or any other suitable means known in the art. Once the driver is identified, the system begins to monitor and store vehicle data in block 604 via the techniques described herein. In some illustrative embodiments, the initial monitoring (i.e., the first time the vehicle is used for monitoring purposes) will monitor vehicle performance only when the vehicle is in a driver-controlled mode (420), meaning that no automated (e.g., driver-assisted) control features are taken into consideration for the driver profile. However, sensor data (e.g., LiDAR, laser, cameras, etc.) relating to semi-autonomous and fully-autonomous control features are preferably monitored to collect a full complement of driver data relative to the vehicle and its environment. This configuration may be advantageous for capturing vehicle performance that is specific and personal to the driver. In some illustrative embodiments, the vehicle may monitor and store vehicle data when the vehicle is in a driver-controlled mode and further include driving controlled under semi-autonomous modes as well.

In block 606, the vehicle system (e.g., 400) extracts features (e.g., via feature extractor module 410) from the vehicle data and applies a suitable model (e.g., via model fitting module 412) to the extracted features. In block 610 the system performs temporal integration and generates and stores one or more driving profiles in block 612. During operation, the system may be configured such that driver profile data files generated from block 612 are initially treated as preliminary data files during the training/learning period so that sufficient data is collected that ensures an accurate driving profile. In an illustrative embodiment, the amount of data collected for training may be fixed according to a predetermined temporal threshold (e.g., hours, days, weeks months). In another illustrative embodiment, the amount of data collected may be dynamically determined by comparing collected data sets to previous data sets, and determining if the normalized data sets are within a predetermined range. As an example, during a training/learning phase, the processor (e.g., 107) may be configured to keep a driver profile as a preliminary driver profile until 3 or more collected data sets are within a 20% range of variance. In other words, the vehicle processor looks for vehicle performance that has a predetermined level of relative consistency among the data sets before converting a preliminary driver profile to a driver profile data file. Also, the driver profile data may be configured to a specific car, and, in some illustrative embodiments, may be configured to a specific vehicle type (e.g., a vehicle model and/or vehicle classification, such as compact, mid-sized, full-size, etc.)

Figure 7:
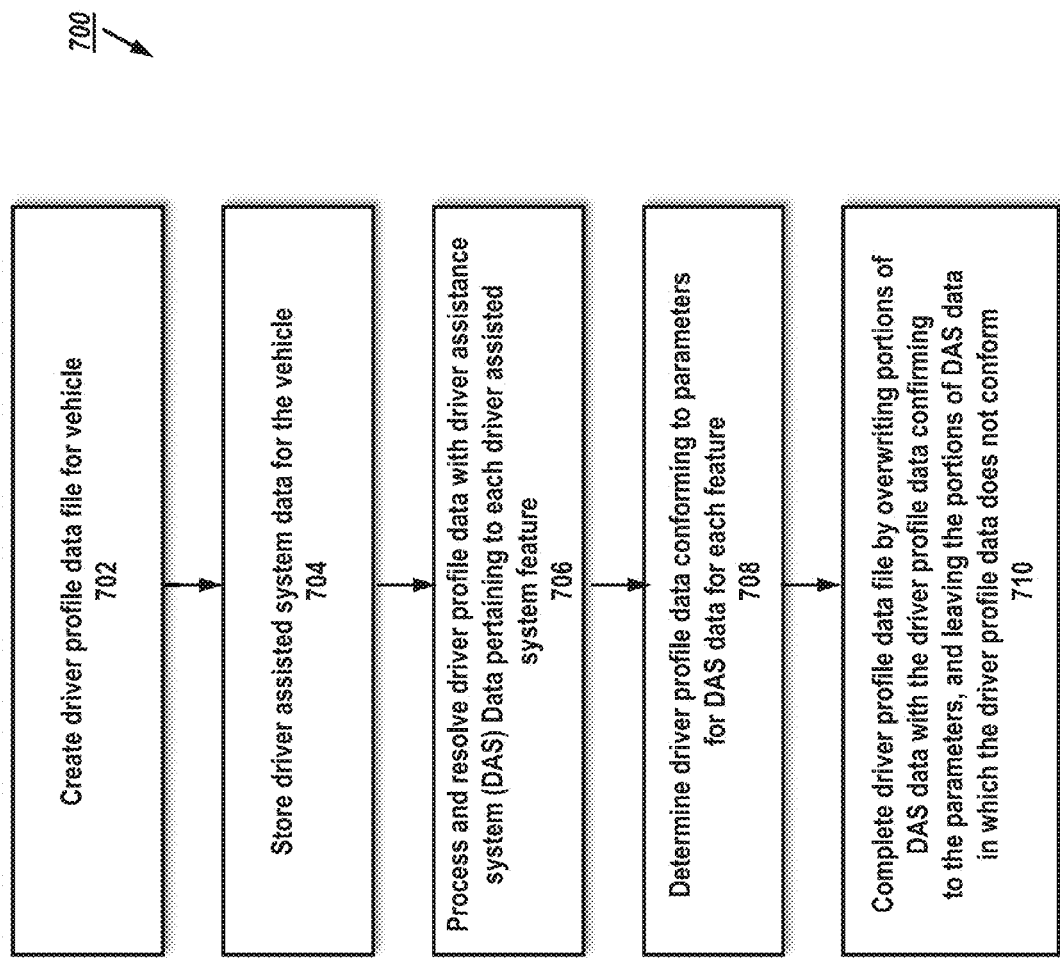
FIG. 7 shows a process for creating a driver profile data file by processing and resolving driver profile data against vehicle driver assistance data and may be used or recalled for a driver and/or shared with other drivers.

FIG. 7 shows a process 700 for creating a driver profile data file by processing and resolving driver profile data against vehicle driver assistance data, and may be used or recalled for a driver and/or shared with other drivers under an illustrative embodiment. In this example, a driver profile data file (e.g., via 600) is created for the vehicle in block 702. As explained above, in some illustrative embodiments, the driver profile data file is created after a training/learning period described above in connection with FIGS. 4-6. In block 704, the vehicle loads and stores driver assistance system data for the vehicle. The driver assistance system data may include data relating to any aspect of controlling semi-autonomous and/or fully autonomous functions of the vehicle (e.g., 100). In block 706, the system may process and resolve driver profile data with driver assistance system data pertaining to each driver assistance system feature of interest (e.g., adaptive cruise control, automatic parking, etc.). In one example, a resolution process for block 706 may include applying a tolerance parameter to the stored driver assistance system data from block 704, and then comparing the driver profile data to the driver assistance system data. In another example, the driver assistance system data may be normalized and compared to normalized driver profile data. In still further examples, quantitative comparisons may be made between the driver assistance system data and the driver profile data, where spatial and temporal distributions and variables are determined, as well as biases and/or standard deviations.

In block 708, the system determines driver profile data that conforms to the tolerance parameters for the driver assistance data for each features. For example, the system may compare driver profile data to assisted driving data for a block of time as it relates to the brake pedal position (e.g., 502), steering wheel angle (e.g., 504), lateral acceleration (e.g., 506) and gear shift level (e.g., 510) for a period of driving relating to a particular geographical area (e.g., via 520). The system may also take in data relating to exterior sensors, such as those illustrated in FIG. 3. During resolution, the system determines which data points for each feature is within an accepted tolerance parameter for that feature (e.g., vehicle having a distance that is ±10% to objects while on a highway). In block 710, the system creates and stores a public driver profile data file by overwriting the driver assistance system data with the driver profile data conforming to the tolerance parameters, and leaving the portions of the driver assistance system data in which the driver profile data does not conform to the tolerance parameters.

It should be appreciated by those skilled in the art that the present disclosure provides customizable driver profiles (public driver profile data file) that may supplement driver assistance system features that are used in semi-autonomous and fully-autonomous operation. Accordingly, adaptable driving styles may be created that mimic the driving style of the vehicle owner, and may further provide libraries of other driving styles for different driving environments that may be created by family members, friends, celebrities, and the like. As safety is always a paramount concern, the resolution of driver profile data with factory-created driver assistance data ensures that potentially unsafe driving characteristics (i.e., driver profile data not conforming with tolerance parameters) are not carried over into a public driver profile data file that may be shared with others. In some illustrative embodiments, the driver profile may be used to modify vehicle driver-assisted warnings so that they may be made stricter or more lenient from factory settings.

Figure 8C:
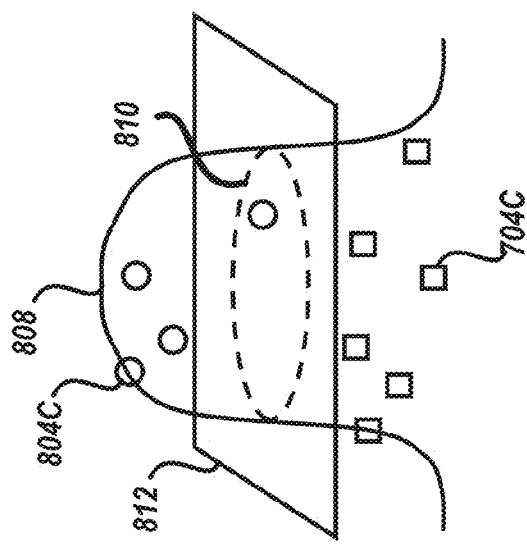
FIG. 8C shows mapping of the vehicle data vectors of FIG. 8B into a feature space under an illustrative embodiment.
Figure 8B:
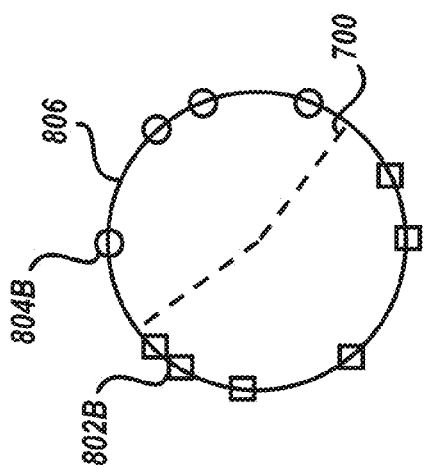
FIG. 8B. shows normalization of the vehicle data vectors of FIG. 8A such that they lie on a unit hypersphere in input space.
Figure 8A:
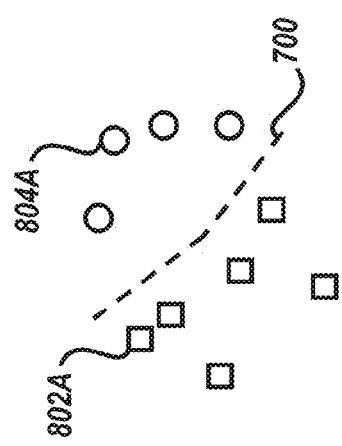
FIG. 8A shows vehicle data represented as two classes of vectors in an input space under an illustrative embodiment.

Turning now to FIGS. 8A-8C, a simplified example of normalization for vehicle data is shown, where the normalization technique may be applied to any of the embodiments discussed above in connection with FIGS. 4-7. In some illustrative embodiments, the normalization of vehicle data may assist in freeing the collection of vehicle data relations from undesirable insertion, update and deletion dependencies, to reduce the need to restructure the collection of vehicle data relations as new data types are introduced, and to make relational models more informative to users. In the embodiment of FIGS. 8A-8C, an example is given relative to a support vector machine (SVM), which may be considered a discriminative classifier formally defined by a separating hyperplane. In other words, given labeled training data (supervised learning), the algorithm outputs an optimal separating hyperplane (OSH) which categorizes new examples.

FIG. 8A shows two classes of vectors (802A, 804B) relating to vehicle data in a two dimensional (2-D) input space, separated by a decision function, shown as dotted line 700. In one illustrative embodiment, vehicle data vectors x may be represented as $x \in \mathbb{R}^N$, where a corresponding normalized vector $\tilde{x}$ may be expressed as $$\tilde{x} = \frac{x}{\|x\|} \in \mathbb{R}^N, \text{ where } \|x\|^2 = \sum_{i=1}^{N} x_i^2.$$

FIG. 8B shows the resulting normalization of the vectors of FIG. 8A (802B, 804B) such that they all lie on a unit hypersphere 806 in input space. FIG. 8C shows mapping of these vectors (802C, 804C) into the feature space 808. The operation of the SVM algorithm may be based on finding a hyperplane 810, 812 that gives the largest minimum distance to the training examples. As such, an OSH may be configured to maximize the margin of the training data. In one example, the SVM may find an OSH in the feature space utilizing a nonlinear mapping from the normalized input space, which is shown in FIG. 8C. Using a normalization for the vehicle data, detection of features of interest and modeling may be improved.

Figure 9:
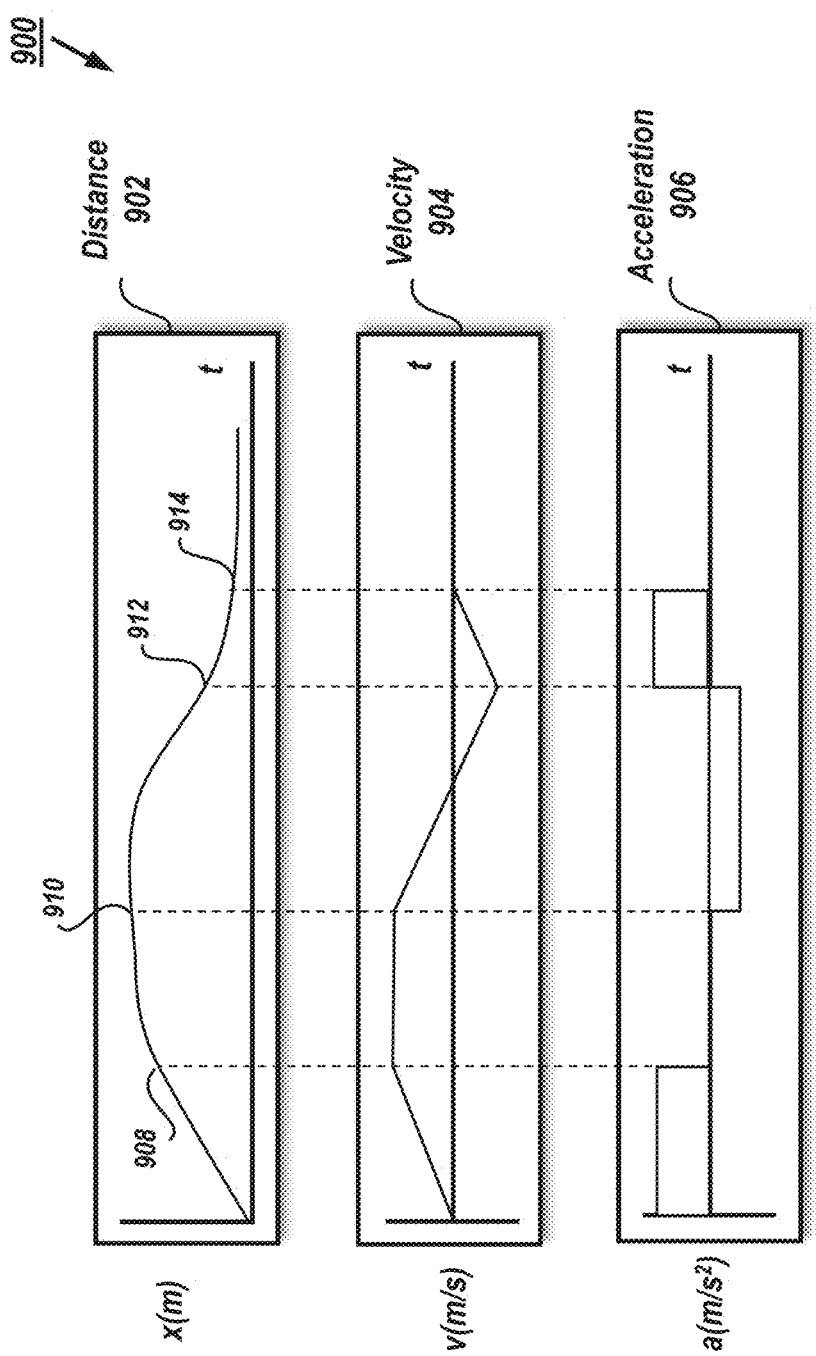
FIG. 9 shows simulated graphs of extracted features including distance, velocity and acceleration over time under an illustrative embodiment.

FIG. 9 shows simulated graphs of extracted features of vehicle data (training data) including distance x(m) 902, velocity v(m/s) 904 and acceleration a(m/s$^2$) 906 over time (t) under an illustrative embodiment. In this simplified example, the data of FIG. 9 may be utilized as extracted features to determine a vehicle's motion, which may be determined in terms of displacement (x), time (t), velocity (v), and acceleration (a), where velocity may be determined by the rate of change of displacement and the acceleration may be determined by the rate of change of velocity. Extracted distance features 902 is shown in the example as a series of displacement measurements for a vehicle over time. During the same time period, the extracted velocity features 902 are simultaneously obtained, along with extracted acceleration features 904.

It should be understood by those skilled in the art that the example of FIG. 9 that the extracted features are depicted in terms of constants for the purposes of simplifying the present disclosure. Constant acceleration motion may be characterized by graphs of distance 902, velocity 904 and acceleration as functions of time depicted as one-dimensional motion, where changed acceleration is constant within a given time segment. Of course, variable acceleration (i.e., continuously changing), is contemplated in the present disclosure, but is not explicitly discussed for the purposes of brevity.

A considerable amount of information about the motion of a vehicle can be obtained by processing the slope(s) of extracted features of the various graphs. In this example, the slope of the graph of position as a function of time may be equal to the velocity at that time, and the slope of the graph of velocity as a function of time may be to the acceleration. For the time period beginning from zero to time 908, the increasing slope in distance 902 may be indicative of increasing slope, while a constant slope would indicate a constant velocity. The positive slope in velocity 904 would indicate a positive acceleration 906. From time period 908 to 910, the decreasing slope of distance 902 would indicate decreasing velocity 904, where the horizontal (zero) slope of velocity 904 implies zero acceleration.

The horizontal point of distance 902 at time 910 implies zero velocity, followed by the negative slope towards time 912 would indicate negative velocity 904, and the negative slope of velocity 904 implies negative acceleration 906. The flattening curve of distance 902 between times 902 and 914 implies velocity 904 becoming less negative. The relatively zero slope of distance 902 after time 914 implies the vehicle is at rest, thus indicating zero velocity 904 and acceleration 906.

Using the extracted features of FIG. 9, a system (e.g., 200) may determine vehicle driver usage characteristics, such as speed and/or acceleration, for a specific user over time. It should be understood by those skilled in the art that the configuration of FIG. 9 may be arranged for a single extracted feature (e.g., velocity) to determine driver usage characteristics, and may also be arranged for multiple and/or combined features (e.g., velocity, acceleration). Furthermore, multiple and/or combined features may be used for any suitable feature combination likely to provide useful information, that includes, but is not limited to, velocity, acceleration, braking, turning radius, brake pedal position, steering wheel angle, turn signal, gear shift level, vehicle speed, engine speed, yaw rate, fuel consumption rate, GPS data, proximity of object to vehicle, rain sensors, light, etc.

The raw feature data may be processed in numerous way to obtain statistically meaningful data from the extracted features. To this end, statistical processing techniques may be employed that include, but are not limited to, mean processing, standard deviation processing, regression processing, sample size determination processing and hypothesis testing (t-testing). Additional processing, such as filtering and threshold processing may be used to ensure that extracted feature data from a vehicle conforms with certain safety parameters.

FIG. 10 shows a simulated graph of feature clusters for resolving extracted features according to a global safety metric over time under an illustrative embodiment. In this example, the global metric includes a first maximum threshold 1002A, a second maximum threshold 1004A, a first minimum threshold 1002B and a second minimum threshold 1004B. The first thresholds 1002A-1002B may be an initial threshold, such as a default or factory setting threshold for a vehicle that is within a value or margin for safety. The second thresholds 1004A-1004B may be an extended threshold that is within a certain tolerance range (e.g., 5-10%) from the initial threshold as shown in the figure.

As features are extracted over a time period, certain features may be repeatedly extracted, resulting in feature data clusters 1006 for each time point during a time period in which features are extracted. In the example of FIG. 10, feature data cluster 1006 represents a plurality of data points extending along line 1006 that include at least one maximum feature data value 1008A and at least one minimum feature data value 1008B. This configuration may repeat throughout the time period as shown until the last data cluster 1010 for the time period is obtained.

During threshold processing, the system (e.g., 200) may determine if feature data points in the feature data cluster 1006 exceed a maximum threshold (e.g., 1004A). If so, these values (e.g., 1008A) may be filtered or removed from the cluster and the feature data cluster is modified to an updated maximum value 1008C, which is below the maximum threshold (e.g., 1004A). Similarly, the system (e.g., 200) may determine if feature data points in the feature data cluster 1006 exceed a minimum threshold (e.g., 1004B). If so, these values (e.g., 1008B) may be filtered or removed from the cluster and the feature data cluster is modified to an updated minimum value 1008D, which is above the minimum threshold (e.g., 1004A). It should be understood by those skilled in the art that numerous different threshold configurations of different numbers and types are contemplated in the present disclosure. Furthermore, while the example of FIG. 10 provides a simplified example of applying linear thresholds, other threshold configurations, such as non-linear thresholds, are possible as well.

FIG. 11 shows a simulated graph of feature clusters for resolving extracted features according to a local safety metric over time under an illustrative embodiment. Similar to the embodiment of FIG. 10, as features are extracted over a time period, certain features may be repeatedly extracted, resulting in feature data clusters 1102, 1110 for each time point during a time period in which features are extracted. In the example of FIG. 11, feature data cluster 1102 represents a plurality of data points extending along line 1102 that may include at least one maximum feature data value 1108A and at least one minimum feature data value 1108B. This configuration may repeat throughout the time period as shown until the last data cluster 1110 for the time period is obtained.

In this example, instead of employing global metrics (e.g., 1002A-B, 1004A-B) that extend throughout the time period in which feature clusters are obtained, a local safety metric is depicted as maximum 1106A and minimum 1106B local thresholds that are applied to each individual feature cluster 1102. Here, a mean value 1104 is determined for each entire feature cluster 1102, and if the mean value 1104 is within the allowed threshold(s) (1106A, 1106B), it is retained. In one example, if the mean value 1112A is outside the thresholds (1114A, 1114B), it may be filtered or removed, and/or weighted 1112B such that the mean value is with acceptable threshold limits. It should be understood by those skilled in the art that the simplified example of FIG. 11 merely provides on illustrative configuration, and that numerous other configurations are contemplated in the present disclosure. For example, other statistical processing techniques may be employed instead of, or in addition to, mean value processing as shown in the embodiment. Additionally, different kinds of thresholds may be applied to each feature cluster, and may further be combined with one or more global safety metrics that include a maximum and/or minimum value(s).

Using the techniques disclosed herein, driver profile data may be processed so that it may be used in different applications in a safe and reliable manner. In a typical application, driver profile data is most readily loaded and applied in another vehicle that is the same or similar make and model as the vehicle in which the driver profile data is created. In certain applications however, the driver profile data may not be safely loaded into another type of vehicle. For example, driver profile data created on a sports car would likely contain data characteristics that could not be loaded into a sport-utility vehicle (SUV) and have the SUV perform safely in an autonomous driving environment. By applying (global and/or local) safety metrics to the extracted features, and performing threshold processing and weighting on certain characteristics, driver profile data may be processed to conform to another vehicle's performance differences and/or limitations.

In a preferred embodiment, predetermined safety metrics may be created so that the maximum number of extracted features (training data) may be transferred to the vehicle receiving, loading and executing the driver profile data. In one example, safety metrics may be generated for types or classes of vehicles (e.g., sedan, sports car, coupe, wagon, SUV, etc.), where only driver profile data for a vehicle of the same class will be allowed for loading in execution. In some embodiments, driver profile data may be created to conform to a predetermined safety standard (e.g., maximum speed, turning radius, lane changing procedure, etc.), where the driver profile data may be loaded and executed in a car to maximize safety. Such a configuration may be particularly advantageous in applications where a parent may load a safety-focused driver profile into a vehicle in which a younger child is about to drive. Driver profiles may even be commercially offered via a web portal or the like to allow users to customize driver profiles for a vehicle to suit their specific needs.

FIG. 12 shows a process 1200 for applying metrics and/or weights to extracted features to conform a driver profile data file for a vehicle to a vehicle type under an illustrative embodiment. In block 1202, driver profile data for a vehicle model may be loaded. The driver profile data may include extracted features, as discussed above. In block 1204, vehicle model properties and performance characteristics may be associated with the driver profile data file. In this step, the vehicle model properties and performance characteristics may include one or more safety metrics that include thresholds on vehicle performance and/or vehicle capabilities. In block 1206, the process 1200 may determine vehicle model types having similar vehicle properties and performance characteristics. In this step, the vehicle model types having the most similar vehicle properties and/or performance characteristics may be determined via extracted features and/or feature clusters that meet or exceed the threshold(s) of the safety metrics. For example, if a driver profile data file meets 75% or more of the safety metrics, the system (e.g., 200) may deem the driver profile data file usable for a particular model type. In another example, driver profile data needing the least amount of weighting (e.g., no more than 20%, averaging less than 20%), to bring the data into conformity may be deemed usable for a particular model type. In a further example, driver profile data that meets a certain percentage (e.g., 50%) of the safety metrics and requires the least amount of weighting (e.g., no more than 20%, averaging less than 15%) may be deemed usable for a particular model type.

In block 1208, the process 1200 may apply the metrics and/or weights to the features to the driver profile data file to conform the driver profile data file for a vehicle model (e.g., Audi A8) to a vehicle type (e.g., sports car). During this step, the threshold processing and weighting described above in connection with FIGS. 10-11 would be performed to modify the features of the driver profile data file prior to it being available for loading and execution in another vehicle. In some illustrative embodiments, a specific driver profile (e.g., one that is specific to a particular vehicle make and model) may be modified to a generic driver profile (e.g., one that may be used across different vehicles of the same vehicle class), which expands the application of diver profile data among users. In some illustrative embodiments, a system (e.g., 200) may be configured to automatically update driver profile data at predetermined times (e.g., 6 months, 1 year) to ensure that the most current data is being used for a vehicle. In some illustrative embodiments, new driver profile data may be "pushed" to vehicles to allow for quick updating of driver profile data, and/or address issues with specific profiles in an expedient manner.

In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system for controlling operation of a vehicle, comprising:
    a processor;
    a driver assistance system, operatively coupled to the processor, wherein the driver assistance system is configured to control one or more functions on the vehicle using driver assistance system data, at least some of which is associated with a first driver profile data; and
    a storage for storing a second driver profile data, wherein the second driver profile data comprises training data relating to a driver's usage characteristics for at least one feature of a vehicle type,
    wherein the processor is configured to process the second driver profile data to determine if at least portions of the second driver profile data conform to a safety metric relating to the vehicle,
    and wherein the processor is configured to weigh a portion of the second driver profile data to conform non-conforming portions of the second driver profile data to the safety metric, wherein the safety metric comprises at least one maximum and/or minimum threshold for a vehicle performance characteristic of the one or more functions,
    and wherein the processor is configured to overwrite at least a portion of the first driver profile data with the conformed second driver profile data to generate a driver profile data file that is configured to control one or more functions on the vehicle using the driver assistance system.

2. The system of claim 1, wherein the at least one maximum and/or minimum threshold for the vehicle comprises a global threshold applied across the training data.

3. The system of claim 1, wherein the at least one maximum and/or minimum threshold for the vehicle comprises a plurality of local thresholds applied to individual portions of the training data.

4. The system of claim 1, wherein the processor is configured to statistically process the second driver profile data prior to determining if at least portions of the second driver profile data conform to a safety metric relating to the vehicle.

5. The system of claim 4, wherein the processor is configured to statistically process the second driver profile data using mean processing, standard deviation processing, regression processing, sample size determination processing and hypothesis testing.

6. The system of claim 1 wherein the driver profile data file is configured to control one or more functions on the vehicle using the driver assistance system when the vehicle is in one of a semi-autonomous or fully-autonomous mode.

7. The system of claim 6, wherein the driver profile data file is configured to modify vehicle warnings based on the driver control data.

8. A method for controlling operation of a vehicle, comprising:
    storing driver assistance system data, at least some of which is associated with a first driver profile data, for controlling one or more function of the vehicle via a driver assistance system;
    storing second driver profile data in a storage, wherein the second driver profile data comprises training data relating to a driver's usage characteristics for at least one feature of a vehicle type;
    processing, via a processor, the second driver profile data to determine if at least portions of the second driver profile data conform to a safety metric relating to the vehicle;
    weighing, via the processor, a portion of the second driver profile data to conform non-conforming portions of the second driver profile data to the safety metric, wherein the safety metric comprises at least one maximum and/or minimum threshold for a vehicle performance characteristic of the one or more functions; and
    overwriting and storing at least a portion of the first driver profile data with the conformed second driver profile data as a driver profile data file for controlling one or more functions on the vehicle using the driver assistance system.

9. The method of claim 8, wherein the at least one maximum and/or minimum threshold for the vehicle comprises a global threshold applied across the training data.

10. The method of claim 8, wherein the at least one maximum and/or minimum threshold for the vehicle comprises a plurality of local thresholds applied to individual portions of the training data.

11. The method of claim 8, wherein processing the second driver profile data comprises statistically processing the driver profile data prior to determining if at least portions of the second driver profile data conform to a safety metric relating to the vehicle.

12. The method of claim 11, wherein statistically processing the second drive profile data comprises mean processing, standard deviation processing, regression processing, sample size determination processing and hypothesis testing.

13. The method of claim 8, further comprising controlling one or more functions on the vehicle using the driver assistance system via the driver profile data file when the vehicle is in one of a semi-autonomous or fully-autonomous mode.

14. The method of claim 13, further comprising modifying vehicle warnings based on the driver control data.

15. A method for controlling vehicle operation, comprising:
storing driver assistance system data for controlling one or more vehicle functions via a driver assistance system, wherein at least a portion of the driver assistance system data is associated with a first driver profile data;
storing second driver profile data in a storage, wherein the second driver profile data comprises training data relating to a driver's usage characteristics for at least one feature of a vehicle model;
processing, via a processor, the second driver profile data to determine if at least portions of the driver profile data conform to a safety metric relating to a vehicle class;
weighing, via the processor, a portion of the second driver profile data to conform non-conforming portions of the second driver profile data to the safety metric, wherein the safety metric comprises at least one maximum and/or minimum threshold for a vehicle performance characteristic of the one or more functions; and
overwriting and storing at least a portion of the first driver profile data with the conformed second driver profile data as a driver profile data file for controlling one or more functions on a vehicle belonging to the vehicle class using the driver assistance system.

16. The method of claim 15, wherein the at least one maximum and/or minimum threshold for the vehicle comprises a global threshold applied across the training data.

17. The method of claim 15, wherein the at least one maximum and/or minimum threshold for the vehicle comprises a plurality of local thresholds applied to individual portions of the training data.

18. The method of claim 15, wherein processing the second driver profile data comprises statistically processing the driver second profile data prior to determining if at least portions of the driver profile data conform to a safety metric relating to the vehicle.

19. The method of claim 18, wherein statistically processing the second driver profile data comprises mean processing, standard deviation processing, regression processing, sample size determination processing and hypothesis testing.

20. The method of claim 15, further comprising controlling one or more functions on the vehicle using the driver assistance system via the driver profile data file when the vehicle is in one of a semi-autonomous or fully-autonomous mode.

* * * * *